United States Patent [19]

Kerins et al.

[11] Patent Number: 4,844,498

[45] Date of Patent: Jul. 4, 1989

[54] TRAILER HITCH

[76] Inventors: George C. Kerins, 607 S. Jackson, Hinsdale, Ill. 60521; James Kerins, 63 W. 75th Pl., Willowbrook, Ill. 60514

[21] Appl. No.: 75,553

[22] Filed: Jul. 20, 1987

Related U.S. Application Data

[63] Continuation-in-part of Ser. No. 6,473, Jan. 23, 1987, abandoned.

[51] Int. Cl.$^4$ .............................................. B60D 1/04
[52] U.S. Cl. ...................................... 280/504; 70/34; 280/507; 280/511
[58] Field of Search ............... 280/504, 507, 508, 511, 280/512, 514; 70/32, 33, 34

[56] References Cited

U.S. PATENT DOCUMENTS

| | | | |
|---|---|---|---|
| 2,217,148 | 10/1940 | Weiss | 280/509 |
| 2,431,694 | 12/1947 | Johnson | 280/504 |
| 2,591,487 | 4/1952 | Wirz | 280/504 |
| 2,697,618 | 12/1954 | Hulstedt | 280/515 |
| 2,766,995 | 10/1956 | Weiss | 280/504 |
| 2,842,380 | 7/1958 | Weiss | 280/504 |
| 3,475,037 | 10/1969 | Weiss | 280/504 |
| 3,479,057 | 11/1969 | Miller | 280/511 |
| 3,712,642 | 1/1973 | Burroughs | 280/504 |
| 3,730,558 | 5/1973 | Litzenberger | 280/511 |
| 3,779,653 | 12/1973 | Charlton | 403/3 |
| 3,963,266 | 6/1976 | Thelin | 280/504 |
| 4,576,021 | 3/1986 | Holden | 70/34 |

FOREIGN PATENT DOCUMENTS 300750 11/1928 United Kingdom .

OTHER PUBLICATIONS 4 photographs depicting the Trailer Hitch previously Produced by the inventors before this invention.

*Primary Examiner*—Mitchell J. Hill
*Attorney, Agent, or Firm*—Allegretti & Witcoff, Ltd.

[57] ABSTRACT

An improved trailer hitch is disclosed for coupling a towing vehicle and a trailer. The invention is suitable for accommodating both ball and socket-type couplings and ring and pintle-type couplings. The integral body of the trailer hitch has the known elements of a rear mount for attaching the body to a towing vehicle, a ball housing with a bore for mounting a removable ball stud, a plate for mating with a towed vehicle, and a passage for connecting a latching arm. The improvement comprises four elements. First, the latching arm has a head, having a front face and a rear face, and a pair of substantially parallel legs integrally attached to opposite sides of the head and extending beyond the faces of the head. Each leg has an aperture for mating with the passage of the integral body and engaging a pin. Second, to prevent rotation of the latching arm, a notch on the integral body seats the rear face of the latching arm. Third, a pin is provided for insertion through the apertures of the legs and the passage of the integral body to lock the latching arm in place. This pin engages the final element of the improvement: a locking device prevents the pin from disengaging the apertures and passage. By including an insert into the passage of the integral body, the latching arm can attain multiple fixed positions and the hitch can accommodate a variety of different sized ball couplings.

13 Claims, 3 Drawing Sheets

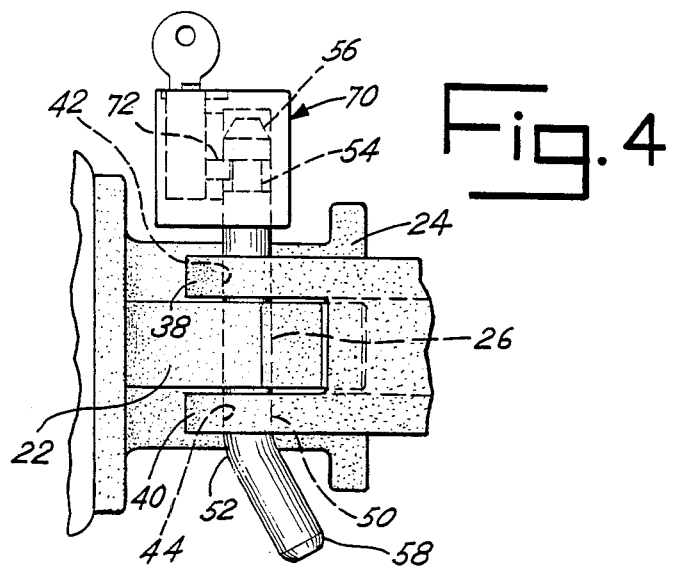
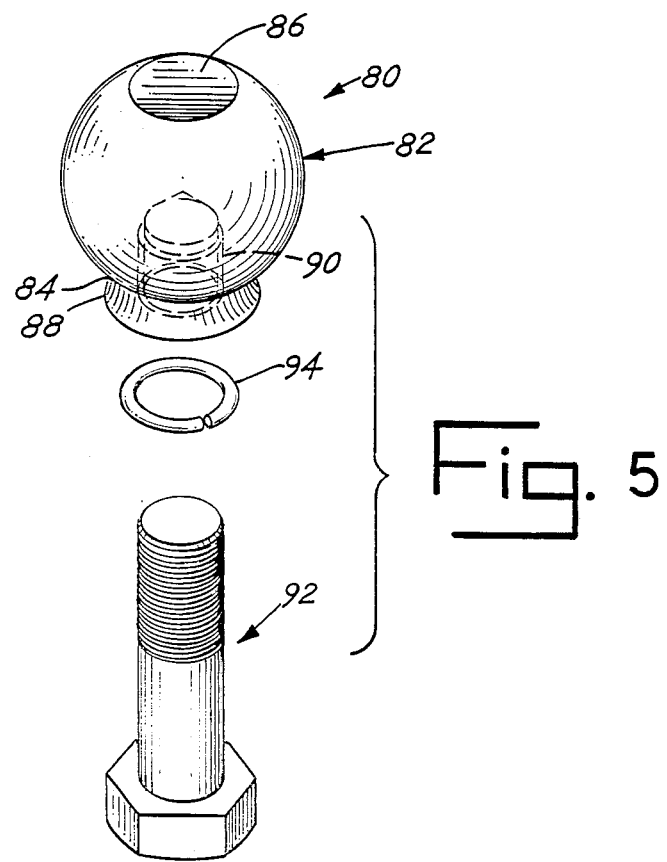

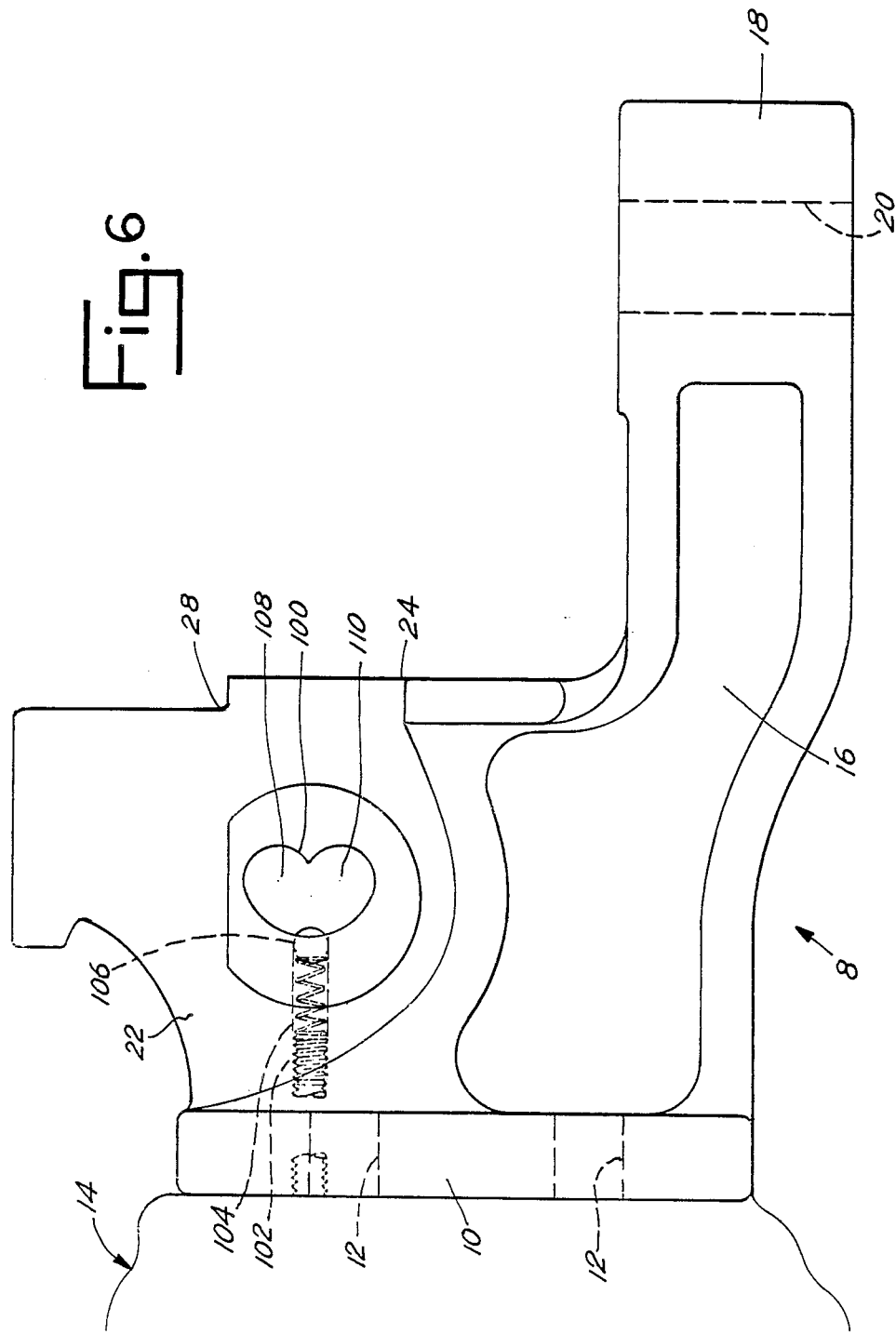

TRAILER HITCH

BACKGROUND OF THE INVENTION

This application is a continuation-in-part of pending application Ser. No. 006,473, filed January 23, 1978 now abandoned.

The present invention relates generally to an improved trailer hitch of the type which couples a towing vehicle and trailer. More specifically, the invention relates to a hitch suitable for accommodating both ball and socket-type coupling and ring pintle-type couplings.

An improved trailer hitch according to this invention includes a latching arm that has a pair of legs with apertures for mating with and surrounding a guide passage extending completely through the integral body of the hitch. A tubular pin can be inserted through the apertures and the guide passage to fix the latchign arm to the body of the hitch.

In one embodiment of the invention, the guide passage includes an insert. The shape of this insert enables the latching arm to attain multiple fixed positions with its head properly located over different sized ball studs. When the pin is inserted through the apertures and the insert of the guide passage, a detent engages the pin and fixes the latching arm in one of the multiple fixed position-the position appropriate for the ball stud then in use.

The body of the hitch contains a notch that, when the pin is inserted, locks the latching arm in place with its head over the ball stud. This design prevents the latching arm from pivoting or rotating. The latching arm has only three positions: the latching arm is disconnected and independent from the hitch body when the pin is removed, the latching arm can be fixed in an upright position between the rear mount and the tranverse column with the pin inserted, of the latching arm be fixed in its operative position, seated on the notch of the hitch body, with the pin inserted.

According to this invention, the tubular pin has a beveled tip at one extremity to facilitate handling. Near this extremity, the pin is curved to prevent movement of the pin through the apertures and guide passage. The pin has a groove closer to its opposite extremity; this groove engages a lock which prevents theft and inadvertent disengagement of the latching arm from the hitch body. Finally, the pin end opposite the beveled tip is chamfered to facilitate insertion of the pin into the apertures and guide passage.

The integral body of the hitch has a ball housing that accepts a bolt for attaching a ball stud to the hitch body. This design accommodates a variety of different sized ball studs. Therefore, a variety of trailers can be connected to the same towing vechicle without removing the hitch body from the towing vehicle.

The ball stud itself is rounded and has a flat top to accept a ball and socket type coupling. The ball stud also has an integral neck and flange for attaching a ring; the neck and flange perform the same function as a conventional pintle. Therefore, the improved trailer hitch according to this invention accommodates either a socket or a ring of a trailer.

The invention has a wide range and variety of applications and uses. It is particularly useful in truck installations. The integral body of the hitch is mounted on the rear of a truck. The socket or ring of a trailer is inserted over or around, respectively, the appropriately sized ball stud, which is bolted to the hitch body.

Presently known devices that connect trucks to trailers abound. Many of the devices are hitch assemblies that accommodate only the standard ball and socket-type couplings; other assemblies accommodate only the ring and pintle-type couplings. A few known devices can accommodate both types of couplings.

All of these devices, however, may be grouped into two categories. The first category includes more complicated devices, which often require time, a number of steps, skill, and perhaps tools to connect and disconnect the trailer and towing vehicle. Even if assembly is unaffected, the difficulty and expense of manufacturing these devices is often a drawback.

These more complicated devices usually have a latching arm pivotally mounted on the body of the hitch. Because the arm is mounted and not removable, it is subject to forceful impact and damage by the trailer ring or socket on assembly. Moreover, the driver of the towing vehicle may drive away with the latching arm in an inoperative position. A spring mechanism coerces the latching arm into position over the ball stud so that the trailer ring or socket is locked within the hitch. The coercive force exerted by the spring poses a danger for the operator; the spring may cause the latching arm to slam on a hand or finger. The spring also may be lost or become ineffective, thereby impairing the safety of the hitch. In addition, internal springs are relatively inaccessible and cannot be replaced without using special tools and removing the hitch from the vehicle.

The second category of known devices for coupling towing vehicles and trailers includes the more simple strutures. These devices usually have an integral ball stud or hook end for attaching the ring or socket of the trailer. This integral design prevents the interchangeability riquired for the same hitch to accommodate a variety of trailers with different sized rings or sockets. A cotter pin ensures against inadvertent disengagement in these more simple devices. Such a pin, subject to road vibration and shearing forces, may fail and cause accidents during road use.

Simple or complex, none of the presently known devices includes a means to lock the trailer ring or socket within the hitch assembly. Absent such a lock, inadvertent disengagement remains a constant problem and intentional theft remains a concern. Thus, although they are often satisfactory in operation, none of the presently known devices avoids all of the disadvantages common to coupling trailers to towing vehicles.

SUMMARY OF THE INVENTION

It is an object of the invention to provide a device that can secure a trailer to a towing vehicle while avoiding the disadvantages of the known devices. More specifically, one object of the invention is to provide a latching arm that does not pivot or rotate. A device with fewer moving parts reduce accidents during road use.

A related object is to prevent inadvertent disengagement of the hitch. The latching arm has only three positions: it can be completely removed from the hitch body, it can be locked in an upright position, or it can be locked in place with its head over the flat top of the ball stud. Because the latching arm cannot be half-locked, the invention avoids inadvertent disengagement of the latching arm from the locked position to the half-locked position.

The inventive design allows complete removal of the latching arm from the hitch body. This features enables the invention to attain two further objects. First, removal of the latching arm during coupling prevents forceful impact between the trailer ring or socket and the latching arm. This prevention fosters convenience and easy coupling, avoids accidents, and increases the life of the parts. Second, because the latching arm can be completely removed when not in use, the driver of the towing vehicle cannot drive away with the latching arm dangerously in a half-locked or inoperative position.

Springs that coerce the latching arm into its locked position represent a danger to operators; omitting springs from the hitch and increasing safety are objects of this invention. A design without springs also avoids the problem of ineffective or lost springs that further impairs the safety of the coupling.

A further object is to reduce the number of moving parts. The invention does not include a pivoting latching arm, springs, secondary latching members, or cotter pins-all common to previous hitch designs. Such a reduction prevents accidents during road use.

Related to the previous object, another object is to have all wearing parts easily accessible and replaceable without using special tools or removing the hitch from the towing vehicle. Maintenance of the hitch is improved when this object is attained.

A flexible hitch is a further object of this invention. The hitch industry presently uses two different sized hitches to accommodate the two different heights of the three standard ball studs: one hitch accommodates the 1 ⅞ inch and 2 inch ball studs, which are equal height, while a second, separate hitch accommodates the taller 2 5/16 inch ball stud. The ball stud is removable; therefore, the hitch body of this invention can accommodate the different sized balls and connect a variety of trailers. The invention provides an insert which positions the latching arm so that it, too, can accommodate the different sized balls. Moreover, the ball stud design accommodates both ball and socket-type couplings and ring and pintle-type couplings.

It is also an object to provide locking means preventing disengagement of the latching arm. Such a locking means prevents inadvertent disengagement, intentional theft, and accidents.

Quick and easy coupling and uncoupling of the trailer hitch is an object of this invention. Only a single step is required to assemble the hitch and lock a trailer to the towing vehicle. This step involves inserting the pin through the apertures of the latching arm, through the guide passage, and into the locking means.

Finally, it is an object to provide a trailer hitch that is relatively inexpensive and easy to manufacture. The reduction in the number of moving parts enables the invention to achieve this object.

Further objects and advantages of the present invention will be apparent from the following detailed description and the claims, when considered with the accompanying drawings.

BRIEF DESCRIPTION OF THE DRAWING

Two preferred embodiments of the present invention will be described, in detail, with reference to the drawing wherein:

FIG. 4 is a side view of the tubular pin in its completely inserted position;

FIG. 5 illustrates the ball stud and means for mounting the ball stud; and

FIG. 6 is a side view illustrating a second embodiment of the invention.

DESCRIPTION OF THE PREFERRED EMBODIMENTS

Figure 1:
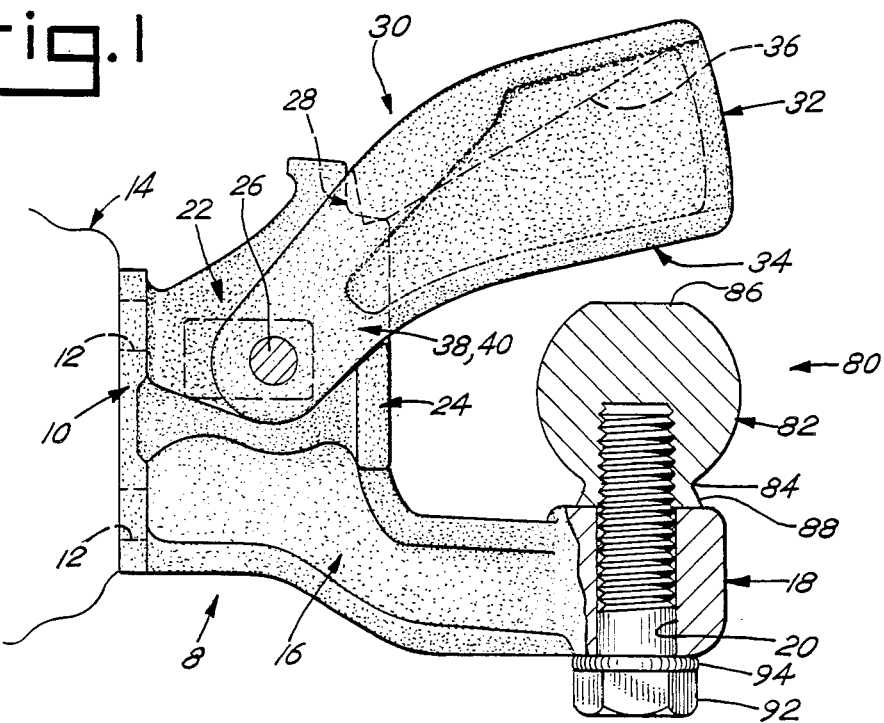
FIG. 1 is a side view illustrating one embodiment of the invention, its components, and their relation to one another.

The improved trailer hitch illustrated in FIGS. 1-5 comprises an integral body 8 (FIG. 1) formed of a material such as steel. This integral body 8 includes a rear mount 10 with a plurality of longitudinal holes 12 to recieve means for attaching the integral body 8 to a towing vehicle 14. In practice, four longitudinal holes 12 arranged in a rectangular pattern are common; two linear holes, three holes in a triangular pattern, or more than four holes are also feasible. Common means for attachment, not shown, include bolts, screws, and the like.

The integral body also includes a longitudinal beam 16 integrally connected to the rear mount 10 at one end. This longitudinal beam 16 extends perpendicularly outward from the rear mount 10 parallel to the longitudinal holes 12 and away from the towing vehicle 14. The longitudinal beam 16 terminates in an integral circular ball housing 18 having a tranverse bore 20 through its center.

A tranverse column 22 is also integral to the integral body 8 and attached to the rear mount 10 on one side. The opposite side of the tranverse column 22 has an integral, transverse, flat plate 24. One end of the tranverse column 22 integrally attaches to the longitudinal beam 16. The opposite end of the transverse column 22 contains both a guide passage 26 extending completely through the transverse column 22 perpendicular to the longitudinal beam 16 and a notch 28.

Figure 2:
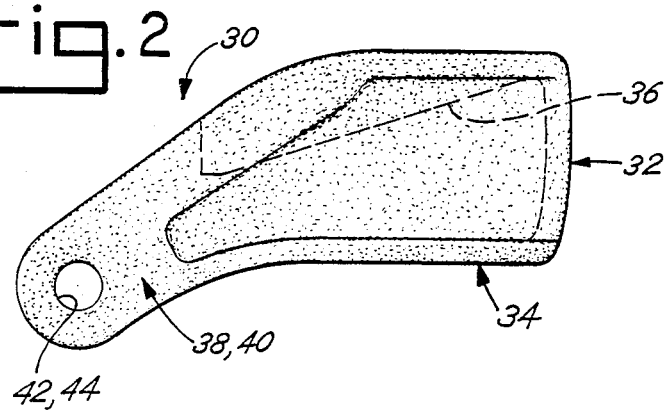
FIG. 2 is a side view of the latching arm.
Figure 3:
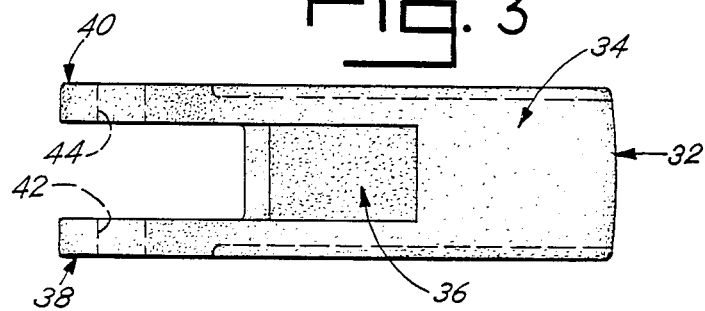
FIG. 3 is a top view of the latching arm.

A latching arm 30 is removably attachable to the integral body 8. This latching arm 30 is formed of a material such as steel. The structure of the latching arm 30 is best shown in FIGS. 2 and 3. The latching arm 30 has a head 32 at one end. This head 32 has a front face 34 and a rear face 36, both integrally attached to the head 32. A pair of substantially parallel legs 38,40 are also integrally attached to opposite sides of the head 32. These legs 38,40 extend beyond the faces 34,36 of the head 32. In the end opposite the head 32, each of the legs 38,40 has a substantially circular aperture 42,44.

A typical head 32 of the latching arm 30 would define, say, a rectangle with a width of approximately 1 ¾ inches and a length of approximately 2 ⅛ inches. The length of the rear face 36 of the latching arm 30 would preferably measure about 3 ¾ inches. The legs 38,40 of the latching arm 30 would be approximately 5 19/32 inches long and ⅜ inches wide, and would have centrally located apertures 42,44 with an approximate diameter of ⅜ inches.

FIG. 1 best illustrates the assembly of the latching arm 30 to the integral body 8. The latching arm 30 is placed so that its legs 38,40 straddle the tranverse column 22 of the integral body 8. The aperture 42,44 of the legs 38,40 line up with opposite ends of the guide passage 26 in the tranverse column 22. In this position, the rear face 36 of the latching arm 30 is seated on the notch 28 of the transverse column 22; the front face 34 of the head 32 of the latching arm 30 is positioned just above the ball stud 80. When the substantially round, tubular pin 50 is inserted through the apertures 42,44 and the guide passage 26, the latching arm 30 is locked in its assembled position. Rotating of the latching arm 30 is impossible in this position.

Referring to FIG. 4, the pin 50 has a beveled tip 58 at one end to facilitate operator handling and prevent interference with external structures. Near this beveled tip 58, the pin 50 has a curvature 52 to prevent movement of the pin 50 through the apertures 42,44 and guide passage 26. At the end opposite the beveled tip 58, the pin 50 has a chamfered tip 56. This chamfered tip 56 facilitates insertion of the pin 50 through the apertures 42,44 through the guide passage 26, and into the locking means 70. Near the chamfered tip 56 is a groove 54 that extends completely around the circumference of the pin 50. This pin 50 is formed of a material such as steel. A typical pin 50 would have a maximum diameter of about $\frac{5}{8}$ inches.

The pin 50 helps to lock the latching arm 30 in its locked position with the integral body 8, as illustrated in FIG. 1. To assemble the pin 50, referring to FIG. 4, the beveled tip 58 is used to push the chamfered tip 56 through the aperture 44 of leg 40, through the guide passage 26 of the transverse column 22, and through the aperture 42 of the leg 38. Insertion of pin 50 continues until the curvature 52 prevents further movement. A standard, conventional locking means 70 having a latch 72 is then placed over the chamfered tip 56 and the groove 54. Activating the locking means 70 caused the latch 72 to engage the groove 54 and fix the locking means 70 to the pin 50. With the curvature 52 blocking movement of the pin 50 on one end, and the locking means 70 blocking movement of the pin 50 on the other end, the pin 50 is securely in place fixing the latching arm 30 to the integral body 8.

The removable ball stud 80 is shown best by FIG. 5. This ball stud 80 can accept either socket-type or ring-type couplings. In a socket-type coupling, the socket fits over the rounded body 82 of the ball stud 80 and contacts the neck 84. Ring-type couplings surround the neck 84 and are prevented from moving in one direction by the rounded body 82 and in the other direction by the flange 88. The flat top 86 of the ball stud 80 provides a contact surface for the latching arm 30 when these ring-type couplings are used. The flange 88 contacts the ball housing 18 to seat the ball stud 80 in place for either type of coupling.

A threaded central opening 90 exists in the ball stud 80 to accept means for mounting the ball stud 80 within the ball housing 18. In a preferred embodiment, this means for mounting comprises a threaded bolt 92 and a lock washer 94. Other means, however, such as a screw or toggle bolt, are feasible. The ball stud 80, threaded bolt 92, and lock washer 94 are all formed of a material such as steel.

FIG. 1 best illustrates the assembly of the ball stud 80 to the ball housing 18 of the integral body 8. The ball stud 80 is placed with its central opening 90 over the transverse bore 20 of the ball housing 18. A variety of different sized ball studs 80 can be used; therefore, the trailer hitch of this invention can accommodate a variety of trailers. The threaded bolt 92 then is inserted through the lock washer 94 and into the end of the transverse bore 18 opposite the ball stud 80. Insertion of the threaded bolt 92 continues until the threaded bolt 92 contacts the central opening 90 of the ball stud 80. Turns of the threaded bolt 92 then draw it within this central opening 90, force the lock washer 94 to contact one end of the ball housing 18, and seat the flange 88 of the ball stud 80 on the opposite end of the ball housing 18. Thus, the ball stud 80 is securely fixed to the ball housing 18 of the longitudinal beam 16 of the integral body 8. A reversal of the above steps removes the ball stud 80 from the integral body 8.

In coupling the improved trailer hitch of this invention, three separate steps are necessary. Because these steps depend upon the previous step, they must proceed in order. Referring to FIG. 1, the first step involves insertion of the appropriately sized ball stud 80 into the housing 18 and tightening the threaded bolt 92 to secure the ball stud 80. The trailer ring or socket then is attached to the ball stud 80. This second step occurs without the securing arm 30 in place to prevent accident or injury.

Finally, the third step in coupling requires assembly of the latching arm 30 in position such that the front face 34 of the head 32 of the latching arm 30 lies over the flat top 86 of the ball stud 80. With the latching arm 30 in this position, a trailer ring or socket that became disengaged from the ball stud 80 would be retained safely within the annular area defined by the ball stud 80, the ball housing 18, the longitudinal beam 16, the flat plate 24, the transverse column 22, and the latching arm 30.

To uncouple the improved trailer hitch, a reversal of the foregoing steps is required. Removal of the ball stud 80 is not required, of course, if the same or a smiilar trailer ring or socket will be used subsequently.

FIG. 1-5 illustrate in detail a first embodiment of the invention. In this embodiment, guide passage 16 in transverse column 22 is substantially round to accommodate the substantially round, tubular pin 50. A second embodiment of the present invention is shown in FIG. 6. In this particular embodiment, guide passage 16 contains a hollow insert 100, which may be a separate piece or formed integrally with transverse column 22. Insert 100 is made of a suitable material, and case hardened steel is suggested.

As shown in FIG. 6, insert 100 has a heart shape including two, separate, substantially circular portions 108,110. Insert 100 could have additional circular portions. For example, a cloverleaf shaped insert 100 would provide four substantially circular portions. The purpose of these circular portions is to fix latching arm 30 in multiple positions. Circular portions 108,110 enable latching arm 30 to attain two positions.

In operation, latching arm 30 is placed so that its legs 38,40 straddle transverse column 22 of integral body 8. Apertures 42,44 of legs 38,40 line up with opposite ends of one of the circular portions 108,110 of insert 100. Pin 50 is then inserted through the apertures 42,44 and the circular portion 108, or 110, as desired, of insert 100. Thus, latching arm 30 is locked in its assembled position.

To prevent pin 50 from slipping out of circular portion 108,110, a detent 102 is provided. Detent 102 includes a loaded spring 104 which forces roller 106 against pin 50 after pin 50 is inserted into one of the circular portions 108,110. The axis of travel for detent 102 is perpendicular to insert 100. Roller 106 enters the hollow center of insert 100 through an opening (not shown) in the inside wall of insert 100.

The purpose of inset 100 is to give the hitch of this invention added flexibility. The hitch industry now uses two separate hitches to accommodate the two different heights of the three standard ball studs 80, with the height defined as the distance between flange 88 and top 86. One conventional hitch accommodates the standard 1 7/8 inch and 2 inch ball studs, which are of equal height. A second, separate, conventional hitch accommodates the standard, taller 2 5/16 inch ball stud.

Insert 100 has two circular portions 108,110 to position latching arm 30 in one of two separate positions depending upon the height of the standard ball stud 80 used. If the industry were to adopt additional ball studs of different heights, insert 100 could have additional circular portions to accommodate these ball studs. With latching arm 30 properly positioned, there is no space between the head 32 of latching arm 30 and the top 86 of a shorter ball stud 80. This prevents the socket or pintle from exiting the hitch. Moreover, a properly positioned latching arm 30 can close over the top 86 of a taller ball stud 80 so that head 32 fits squarely over top 86.

According to the present invention, the improved trailer hitch is quick and easy to couple or uncouple, is easy and inexpensive to manufacture, and offers reliable and extended operation while preventing accident or injury. Two preferred embodiments of the present invention have been disclosed herein. It is to be understood, however, that various changes and modifications can be made without departing from the true scope and spirit of the present invention as set forth and defined in the following claims. For example, words used in the claims to indicate the orientation of elements may serve explanatory purposes and are not meant to limit the scope of the present invention.

What is claimed is:

1. An improved trailer hitch of the type having an integral body including a rear mount having a plurality of longitudinal holes to receive means for attaching said body to a towing vehicle; a longitudinal beam integrally connected to said rear mount at one end, extending perpendicularly outward from said rear mount parallel to said holes and away from said towing vehicle, and terminating in an integral circular ball housing having a transverse bore to receive means for mounting a removable ball stud; and a transverse column integrally attached to said rear mount on one side, having an integral, transverse, flat plate on its opposite side for mating with the attachment means of a towed vehicle, integrally attached to said longitudinal beam at one end, and having a transverse guide passage extending completely through its opposite end perpendicular to said longitudinal beam; wherein the improvement comprises:
   (a) a latching arm including a head, having a front face and a rear face, and a pair of substantially parallel legs each integrally attached to opposite sides of said head, extending beyond said faces of said head, and having a single, substantially circular aperture through its end opposite said head for mating with said guide passage of said transverse column and engaging a pin;
   (b) a notch on said transverse column for engaging said rear face of said latching arm to prevent rotation of said latching arm;
   (c) a substantially round, tubular pin engaging said latching arm at each said aperture of each said parallel leg and said transverse column at said guide passage, said pin having a curvature to prevent movement through said aperture of each said parallel leg and said guide passage near one extremity, and having a groove near its opposite extremity to engage a locking means;
   (d) a hollow insert, having a plurality of substantially circular portions for mating with said aperture of each said parallel leg of said latching arm, engaging said pin, and fixing said latching arm in multiple positions, located in said guide passage of said transverse column; and
   (e) a locking means for engaging said groove of said pin and preventing said pin from slidably disengaging said apertures and said guide passage.

2. An improved trailer hitch as claimed in claim 1 further comprising a detent including a loaded spring attached to a roller for preventing said pin from disengaging said circular portions of said insert.

3. An improved trailer hitch as claimed in claim 1 wherein said insert is steel.

4. An improved trailer hitch as claimed in claim 1 wherein said tubular pin has a chamfered tip near said groove to facilitate insertion of said pin into said apertures and said guide passage, and a beveled tip near said curvature to facilitate handling.

5. An improved trailer hitch as claimed in claim 1 wherein said ball stud has a rounded body for accepting socket-type couplings, a neck for accepting ring-type couplings, a flat top, a flange, and a threaded central opening to receive said means for mounting.

6. An improved trailer hitch as claimed in claim 1 wherein said means for mounting said ball stud comprises a threaded bolt for engaging said ball stud and a lock washer for locking said threaded bolt within said transverse bore of said ball housing.

7. An improved trailer hitch as claimed in claim 1 wherein said head of said latching arm is about 2 1/8 inches long and 1 3/4 inches wide, said rear face of said latching arm is about 3 3/4 inches long, said legs of said latching arm are about 5 19/32 inches long and 3/8 inches wide, and said apertures through said legs are about 3/8 inches in diameter.

8. An improved trailer hitch as claimed in claim 1 wherein said tubular pin has a maximum diameter of about 158 inches.

9. An improved trailer hitch as claimed in claim 1 wherein said trailer hitch is steel.

10. An improved trailer hitch comprising in combination:
   (a) an integral body including a rear mount having a plurality of longitudinal holes to receive means for attaching said body to a towing vehicle;
   (b) a longitudinal beam integrally connected to said rear mount at one end, extending perpendicularly outward from said rear mount parallel to said holes and away from said towing vehicle, and terminating in an integral circular ball housing having a transverse bore to receive means for mounting a removable ball stud;
   (c) a transverse column integrally attached to said rear mount on one side, having an integral, transverse, flat plate on it opposite side for mating with the attachment means of a towed vehicle, integrally attached to said longitudinal beam at one end, and having a transverse guide passage extending completely through its opposite end perpendicular to said longitudinal beam;
   (d) a latching arm including a head, having a front face and a rear face, and a pair of substantially parallel legs each integrally attached to opposite sides of said head, extending beyond said faces of said head, and having a single, substantially circular aperture through its end opposite said head for mating with said guide passage of said transverse column and for engaging a pin;

(e) a substantially round pin engaging said latching arm at each said aperture of each said parallel leg and said transverse column at said guide passage, said pin having a curvature to prevent movement through said aperture of each said parallel leg and said guide passage near one extremity, and having a groove near its opposite extremity to engage a locking means;

a hollow insert, haivng a plurality of substantially circular portions for mating with said aperture of each said parallel leg of said latching arm, engaging said pin, and fixing said latching arm in multiple positions, located in said guide passage of said transverse column; and (g) a locking means for engaging said groove of said pin and preventing said pin from slidably disengaging said apertures and said guide passage.

11. An improved trailer hitch as claimed in claim 10 further comprising a detent including a loaded spring attached to a roller for preventing said pin from disengaging said circular portions of said insert.

12. An improved trailer hitch as claimed in claim 10 wherein said insert is steel.

13. An improved trailer hitch as claimed in claim 10 wherein said trailer hitch is steel.

* * * * *